June 3, 1969    R. A. EYMAN    3,447,382
DOUBLE INTEGRATING ACCELEROMETER
Filed July 6, 1965    Sheet 1 of 2
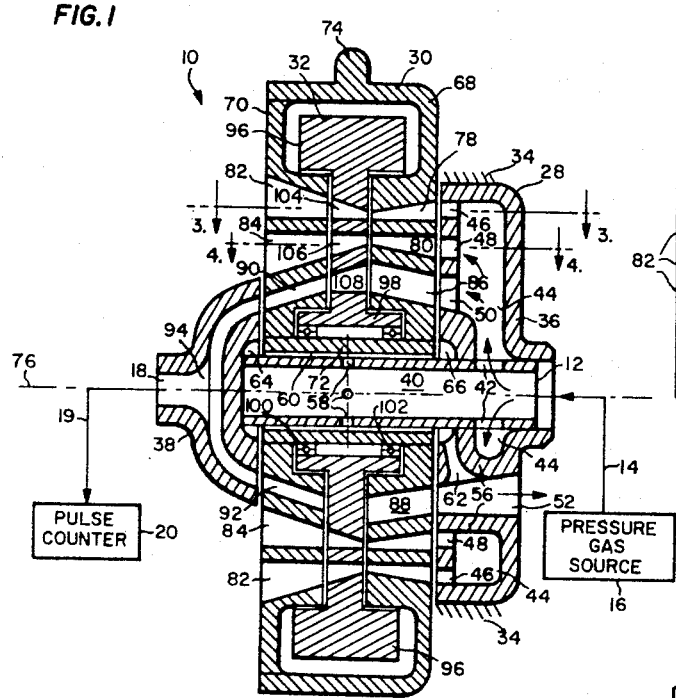
FIG. 1
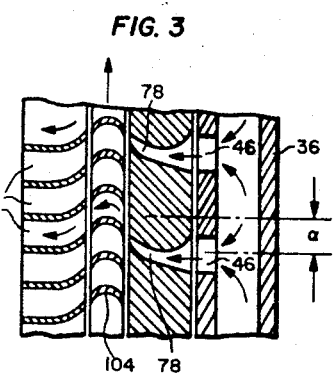
FIG. 3
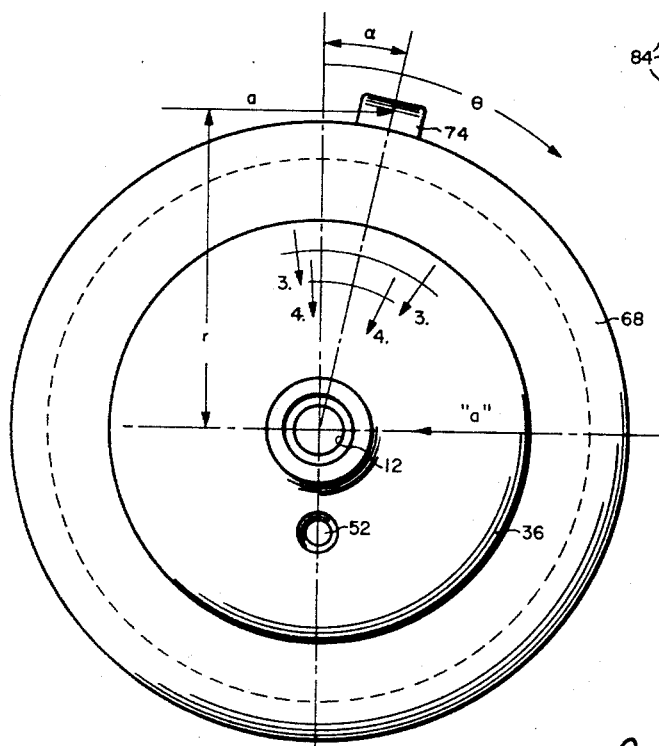
FIG. 2
FIG. 4
INVENTOR
RALPH A. EYMAN
BY Julian C. Renfro
ATTORNEY June 3, 1969            R. A. EYMAN            3,447,382

DOUBLE INTEGRATING ACCELEROMETER

Filed July 6, 1965

*INVENTOR*
RALPH A. EYMAN

BY *Julian C. Renfro*

ATTORNEY

United States Patent Office 3,447,382
Patented June 3, 1969

3,447,382
DOUBLE INTEGRATING ACCELEROMETER
Ralph A. Eyman, Windermere, Fla., assignor to Martin Marietta Corporation, Middle River, Md., a corporation of Maryland
Filed July 6, 1965, Ser. No. 469,658
Int. Cl. G01p 7/00
U.S. Cl. 73—490                    15 Claims

ABSTRACT OF THE DISCLOSURE

This invention relates to an accelerometer arrangement involving a pendulous mass in which a flywheel is mounted, with rotation of the pendulous mass in one direction or the other in response to external acceleration controlling the porting of pressurized fluid to control the speed and direction of rotation of the flywheel. Significantly, the flywheel produces the second integral of such acceleration, and will continue to do so irrespective of internal factors that may exist between the flywheel and the pendulum.

---

This invention relates to a pneumatically operated double integrating accelerometer particularly suited for use in fuzing applications and for use in missile inertial guidance functions. An important feature of the present invention is that it provides a completely mechanical device for measuring distance as the second intergral of acceleration. This is accomplished in a device capable of operating in severe nuclear environments since it provides an inertial device that is completely immune to the effects of neutron and gamma radiation.

Double integrating accelerometers are known and are believed to be used in some applications including the fuzing of rockets and missiles. They have been considered for performing inertial guidance functions in space, orbital and sub-orbital vehicles. The double integrating accelerometers take the form of a mechanical or electrical device, usually providing an analog output indicative of the second integral of acceleration as a function of time.

However, most applications requiring double integration of acceleration actually use a single integrating accelerometer, or velocity meter, and an additional independent integrator to perform the second integration. These prior devices thus require independent timers to perform the second integrating process. Almost all are subject to substantial deterioration under the effects of severe nuclear environments, i.e., when subject to the effects of neutron and gamma radiation, because of electronic circuits involved in the timer, second integrator, or accelerometer. Further, the accuracy of previously available pneumatically operated devices has been dependent upon density, temperature and pressure.

The present invention avoids the above-mentioned difficulties by providing a novel double integrating accelerometer actuated by a pressurized gas such as air or the like and one which is completely mechanical and pneumatic in operation so as to be completely insensitive to extreme nuclear environments. The device of the present invention requires no complex gearing or spring source as do many of the previously proposed devices and provides a relatively simple inexpensive structural arrangement which may be used in a variety of aerospace applications. In addition, it avoids the use of latches, counter-rotating flywheels, hydraulic pressure or other auxiliary devices which have complicated previous equipment. Within the design limits of the device it is completely insensitive to density, temperature and pressure.

In the device of the present invention a source of pressurized gas is supplied through the input manifold of a framework subject to acceleration forces and from this manifold to a rotatably mounted pendulum. This latter element is made pendulous by an unbalance weight sensitive to acceleration forces in a direction transverse to the rotational axis of the pendulous mass such that the pendulous mass acts as a gate or valving element for the accelerometer. Pressure passing through the pendulous mass impinges on the blades or buckets of a further rotatably mounted flywheel or turbine motor which is accelerated under the influence of the incoming pressure fluid.

Depending on the position of the acceleration responsive pendulous mass or valving element the rotating flywheel is either accelerated or decelerated in accordance with the orientation of the impinging air stream on the flywheel blades. Reaction forces are generated between the flywheel and pendulous mass such that an equal but opposite rotational torque is exerted on the pendulous mass in such a direction as to oppose the acceleration forces causing the original pendulous mass displacement. If the pressure of the incoming gas is sufficient, in conjunction with the other parameters of the system, this resultant or reaction force on the pendulous mass will always be greater than the predetermined acceleration forces to which the device is subjected so that the pendulous mass will tend to return toward its initial or zero position. Depending on the choice of parameters the pendulous mass may be constructed to assume a steady state position under the influence of constant accelerations or may be designed to hunt or oscillate about a fixed position, whichever is desired. In any event the rotation of the flywheel is modulated by the amplified acceleration forces applied to the pendulous mass and these forces are doubly integrated by the flywheel whose angular orientation or position is representative of the second integral of acceleration as a functon of time, i.e., distance.

An important feature of this device is that the integrating flywheel is mounted to the pendulum and is totally enclosed within the pendulum assembly. Thus, all action torques exerted on the flywheel have an equal and opposite reaction torque exerted on the pendulum, and vice versa. This arrangement makes a closed system in which angular momentum must be conserved. Angular momentum impressed on the pendulum due to acceleration forces is thus transferred precisely to the flywheel by means of the pressurized gas and valving arrangement in order for the pendulum to remain near the null position.

An important aspect of this arrangement of enclosing the flywheel within the pendulum is that the flywheel will maintain any angular velocity which is imparted to it. Any frictional torques which tend to decelerate the flywheel are at the same time acting on the pendulum in an equal and opposite manner because the flywheel is referenced to the pendulum. These frictional torques tend to displace the pendulum and cause the valves to admit additional pressurized gas to maintain the pendulum near its null position. This gas also exerts torque on the flywheel which is exactly the right value required to compensate for the frictional torques. This ability to maintain an angular velocity indefinitely (or for times long compared to the actual operating time) is an essential feature for double integration in natural (real) time.

A further important feature of the accelerometer of the present invention is the provision of a novel porting assembly in the pendulous mass and flywheel such that a suitable pulsating pressure fluid output is derived indicative of the distance of angular travel of the flywheel. Thus, the present invention produces a pulsating or digital output as opposed to the more conventional analog outputs of prior sructures, which digital output may be used to drive or actuate suitable fuzing, inertial guidance, or other aerospace equipment. While primarily useful for performing double integrations, the single integral of acceleration with respect to time is available at the output of the unit such that the frequency of rotation of the flywheel is indicative of velocity and may be used in situations where this output is desired.

It is therefore one object of the present invention to provide a novel double integrating accelerometer.

Another object of the present invention is to provide a pneumatically operated double integrating accelerometer particularly useful in severe nuclear environments.

Another object of the present invention is to provide an accelerometer having particular application in fuzing, inertial guidance, and other aerospace equipment.

Another object of the present invention is to provide a double integrating accelerometer providing a digital output.

Another object of the present invention is to provide an accelerometer actuated by pressurized gas such as air or the like. In the device compressed gas is passed through a housing including inlet and outlet manifolds which supports a rotatable pendulous element which further supports a turbine type flywheel. Acceleration forces acting on the unbalance weight of the pendulous element cause it to rotate or pivot about its bearing so as to valve the pressurized air supply to the flywheel. Reaction forces on the nozzles in the pendulum develop a torque on the penduluous element opposing the acceleration forces, causing the pendulous element to assume a steady or average position representative of acceleration. At the same time the same gas forces act to accelerate or decelerate the flywheel (positive or negative acceleration) so that the rotational frequency of the flywheel is indicative of the first integral of acceleration and the angular position or co-ordinates of the flywheel represent the double or second integral of acceleration as a function of time, i.e., distance. The action-reaction forces between the pendulum nozzles and flywheel blades produce equal and opposite torques on the pendulum and flywheel.

Further important features of the invention include additional valving whereby a digital output is derived in the form of periodic pressure pulses in the output manifold which pulses indicate a predetermined amount of rotation of the flywheel and by way of example only may occur once for each revolution of the flywheel.

These and further objects and advantages of the invention will be more apparent upon reference to the following specification, claims and appended drawings wherein:

FIGURE 1 is a vertical cross-section through a first embodiment of the double integrating accelerometer of the present invention.

FIGURE 2 is a partial front elevation of the accelerometer of FIGURE 1.

FIGURE 3 is a partial cross-section taken along line 3—3 of FIGURES 1 and 2 illustrating the porting to the first or outer set of buckets or vanes of the flywheel of FIGURE 1.

FIGURE 4 is a partial cross-section taken along line 4—4 of FIGURES 1 and 2 showing the porting to a second or inner set of buckets or vanes on the flywheel of FIGURE 1.

Figure 5:
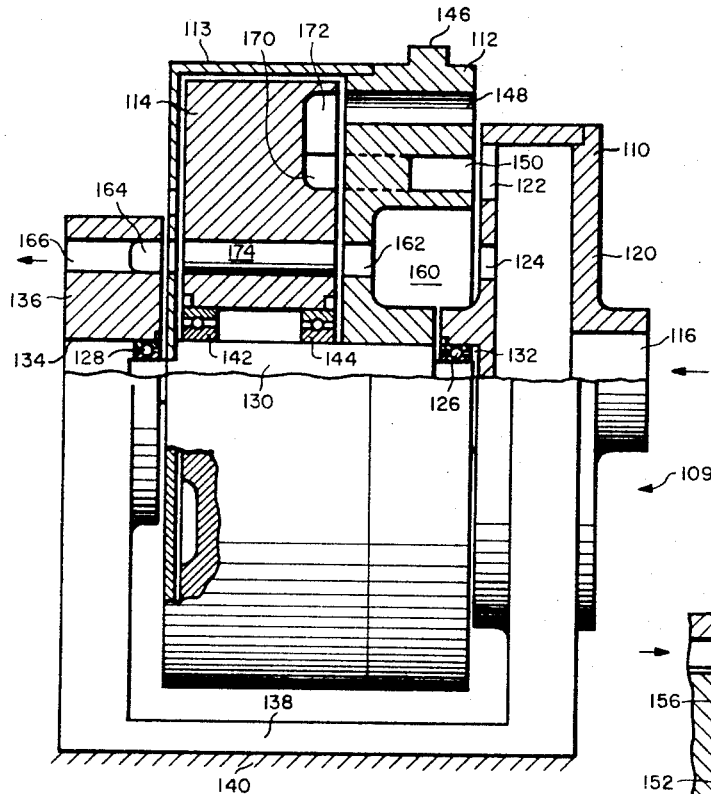
FIGURE 5 is a partial vertical cross-section through a modified embodiment of the double integrating accelerometer of the present invention.

Referring to the drawings and more particularly to FIGURES 1 through 4, the novel double integrating accelerometer of the present invention generally indicated at 10 is provided with a fluid inlet port 12 illustrated as coupled by a supply line 14 to a source of pressurized gas 16 such as air or any other suitable operating fluid under pressure. Accelerometer 10 is also provided with a fluid outlet or signal port 18 illustrated as coupled by way of a pressure line 19 to a suitable fluid pulse counter 20. Pulse counter 20 which may be of conventional construction supplies a suitable output signal to indicate double integration of acceleration, i.e., distance. This signal can be used as required by the particular application. If desired, the output may be used to operate switches, as in fuzing, or to drive conventional inertial guidance equipment commonly used for controlling rockets, missiles, satellites and the like.

Accelerometer 10 is formed of three principal parts, namely, a frame 28, a rotatably mounted pendulous element 30, and a turbine type flywheel 32 surrounded by the pendulous element 30. Inlet port 12 and output signal port 18 are formed in the frame 28 which is rigidly attached to the vehicle or object being accelerated as indicated by the hatching at 34 in FIGURE 1. Thus, frame 28 while subject to acceleration is stationarily mounted with respect to the movable pendulum 30 and rotatable flywheel 32.

Frame 28 in turn consists of three principal parts, namely, an input manifold 36 and an outlet manifold 38, these latter two being rigidly joined by the third part in the form of a central hollow tubular shaft 40. The fluid from pressurized gas source 16, which will hereinafter be referred to as air, passes through line 14 and inlet port 12 to the hollow interior of shaft 40. This shaft is provided with inlet apertures 42 permitting the air to pass through the shaft into inlet manifold chamber 44, as indicated by the arrows in FIGURE 1. The pressurized air is then free to pass from chamber 44 through a first annularly spaced series of ports 46 in the inlet manifold and through a similar second and concentric series of air ports 48. Inlet manifold 36 is in addition provided with a single arcuate signal port 50 and a similar atmospheric exhaust port 52 separated from the manifold chamber 44 by surrounding tubular wall 56.

Hollow shaft 40 is provided with a second group of smaller apertures 58 from which a portion of the incoming pressurized air passes to the annular space 60 between the outer surface of the sleeve and the inner surface of the pendulum 30. This annular space 60 forms an air bearing upon which the pendulum 30 rotates, or more properly oscillates in an angular direction around the hollow shaft 40. Exhaust port wall 56 of manifold 36 is provided with a channel or passageway 62 communicating with annular end chamber 66 in the inlet manifold. In a similar manner, chamber 64 communicates to atmosphere through a channel (not shown) in outlet manifold 38. These latter chambers are in communication with the annular space 60 forming the larger stress bearing portion of the air bearing.

Pendulum 30 comprises a housing 68, a cover 70, an inner sleeve 72, and an unbalance mass 74, all rigidly joined to oscillate as a unit. Housing 68 is provided with an angularly spaced radially outer series of nozzles 78 at the same radial distance from the rotational axis 76 as the inlet manifold ports 46 so that when pendulum 30 is in a first angular position, compressed air from manifold chamber 44 may pass through ports 46 to the nozzles 78.

Housing 68 also includes a second series of angularly spaced radially inner nozzles 80 at the same radial distance from the rotational axis 76 as the series of ports 48 in the inlet manifold. This arrangement is such that when pendulum 30 is in a second position, air from the inlet manifold chamber 44 may pass through the ports 48 to the nozzles 80. The manifold ports and nozzles are equal in number and substantially uniformly spaced completely around the inlet manifold and pendulum respectively. The first series of nozzles 78 may be angularly staggered with respect to the second series of nozzles 80 such that with the pendulum 30 rotated to a position where one series of nozzles, for example, nozzles 78, are open to the ports 46, the other series of nozzles, i.e., nozzles 80, are out of register with the ports 48. That is, air from the inlet manifold chamber 44 is supplied alternately either to the nozzles 78 or to the nozzles 80 (or to neither set of nozzles) but not to both sets of nozzles at the same time in the specific arrangement shown.

Cover 70 of the pendulum 30 is provided with a corresponding first series of exhaust ports 82, at an equal radius with a corresponding one of the sets of nozzles such as 78, and a second series of atmospheric exhaust ports 84, in registry longitudinally of the system with the second set of nozzles 80. Thus, air passing inwardly through the nozzles 78 is exhausted to atmosphere through ports 82 whereas air alternatively passing to nozzles 80 is exhausted to atmosphere through exhaust ports 84 in the pendulum 30. There is preferably one exhaust port for each of the buckets in turbine type flywheel 32.

Pendulum housing 68 is in addition provided with a single digital signal inlet port 86 which is of sufficient angular size so as to always be in registry with the input manifold port 50 irrespective of the angular pendulous movement of pendulum 30. Similarly, the housing is provided with a corresponding signal exhaust port 88 of sufficient size and angular extension to always be in registry with exhaust port 52 in manifold 36 irrespective of the limited angular movement of the pendulum. In registry with these digital signal inlet and exhaust ports in the housing 68 are corresponding signal ports 90 and 92 in the pendulum cover 70. These latter ports communicate with the manifold chamber 94 formed in the outlet manifold 38.

Flywheel 32 comprises essentially a flat circular disc rotatable within pendulum 30 and having an enlarged peripheral edge 96 contributing to the substantial overall mass of the flywheel, and a radially inner enlarged edge or flange 98. This radially inner flange is rotatably mounted about pendulum sleeve 72 by means of ball bearings indicated at 100 and 102. Thus, the flywheel is free to rotate substantially independent of the sleeve under the influence of the pressurized air passing to it from the inlet manifold 36. In order to react to the forces of the incoming pressurized air or gas, the turbine-like flywheel 32 is provided with a first series of vanes 104 forming turbine buckets angularly spaced around it in a circle concentric with the axis of rotation, and a second series of similar vanes 106 also concentric with the axis of rotation but positioned radially inward from the first series of vanes 104. Finally the flywheel is provided with one or more pulse apertures 108 adapted to establish fluid communication once during each revolution of the flywheel with the signal ports 86 and 90 formed in the pendulum 30. This aperture 108, when the flywheel is rotated 180° from the position illustrated in FIGURE 1, further establishes communication between the exhaust ports 92 and 88 once during each revolution of the flywheel so as to exhaust the pressure in outlet manifold chamber 94 through these ports and through exhaust port 52 in the inlet manifold to atmosphere.

As best seen in FIGURES 3 and 4, the vanes 104 and 106 forming the turbine buckets for the flywheel are oppositely oriented in curvature with respect to each other so that the compressed air impinging on one set of vanes will produce a torque in a first rotational direction, i.e., in a clockwise direction, whereas incoming air impinging upon the other set of vanes produces a torque on the flywheel in the opposite direction, i.e., in a counterclockwise direction. The nozzles 78 and 80 are similarly tapered and contoured so as to cooperate with the two different sets of vanes on the flywheel such that the air exiting from the respective sets of nozzles impinges upon the concave surface of the respective sets of vanes, as best illustrated in FIGURES 3 and 4.

As illustrated in FIGURE 2, the angular orientation of the pendulum 30 and hence of the unbalance mass or weight 74 is illustrated by the angle $\alpha$. The angle $\theta$ is representative of the angular orientation or position of the flywheel 32 whereas the acceleration force acting on the unbalance mass is represented by the arrow labeled "$a$" in FIGURE 2. In operation, the pendulous assembly 30 and the flywheel 32 can be considered respectively as the stator and rotor of a reaction turbine so that any torque applied to the flywheel by the incoming pressurized gas imparts an equal and opposite torque to the pendulum 30. Likewise the pendulum 30 and the frame 28 can be considered respectively the piston and body of a three position sliding valve. When the valve is at dead center ($\alpha = 0$) all ports are closed. As $\alpha$ becomes positive, the valve opens to one set of nozzles, for example, to the nozzles 78 as illustrated in FIGURE 3. On the other hand, as $\alpha$ becomes negative the valve opens to the second set of nozzles 80.

Under the influence of an acceleration "$a$" a torque is experienced by the pendulum 30 causing an angular displacement $\alpha$ which opens the ports 46 to the nozzles 78. The air reacts against the flywheel vanes 104 imparting a positive (clockwise in FIGURE 2) torque on the flywheel and an equal and opposite (negative) torque on the pendulum 30 tending to reduce $\alpha$ to zero and hence closing the gas supply to nozzles 78. The torque due to the acceleration tends to always open the ports while the resulting reaction torques tend to close the ports. Depending on the specific design of the device, either an oscillating or steady motion involving the variable angle $\alpha$ will result. If a negative acceleration is experienced by the frame 28 $\alpha$ becomes negative and the action of the torques is reversed. If at any time the reaction between the pendulum and the flywheel is greater than the action due to the acceleration, the pendulum will reverse the sign of $\alpha$ and impart reaction in the opposite sense compensating the difference. An oscillation then results.

The equations of motion for the system of FIGURES 1 through 4 are presented below:

"$a$" = acceleration of moving frame
$a$ = acceleration experienced by unbalanced mass, $$a = -"a"$$

$m$ = mass of unbalance
$r$ = radius (torque arm) of couple ($a$, $-"a"$)
$\alpha$ = angular coordinate of pendulous assembly
$\theta$ = angular coordinate of flywheel
$I_P$ = moment of inertia of pendulous assembly
$I_F$ = moment of inertia of flywheel
$T$ = total kinetic energy of system
$Q_\alpha$ = generalized torque associated with $\alpha$
$Q_\theta$ = generalized torque associated with $\theta$
$P_B(\dot{\alpha})$ = torque due to air bearing friction between pendulous assembly and moving frame as a function of $\dot{\alpha}$
$P_R$ = torque due to turbine reaction between flywheel and pendulous assembly
$P_F$ = sum of all torques due to friction, air leakage reaction and other effects between flywheel and pendulous assembly Using Lagrange's equations and assuming cos $\alpha = 1$ $$T = \tfrac{1}{2} I_F \dot{\theta}^2 + \tfrac{1}{2} I_P \dot{\alpha}^2$$

$$\frac{d}{dt}\left(\frac{\partial T}{\partial \dot{\theta}}\right) = I_F \ddot{\theta} = Q_\theta \quad \frac{d}{dt}\left(\frac{\partial T}{\partial \dot{\alpha}}\right) = I_P \ddot{\alpha} = Q_\alpha$$

$$Q_\theta = P_R - P_F$$

$$Q_\alpha = mra - P_R + P_F - P_B(\dot{\alpha})$$

$$I_F \ddot{\theta} = P_R - P_F$$

$$I_P \ddot{\alpha} + mra - P_R + P_F - P_B(\dot{\alpha})$$

Adding the two above equations and dividing by $I_F$ $$\ddot{\theta}=\frac{mr}{I_F}a-\frac{I_P}{I_F}\ddot{\alpha}+\frac{P_B}{I_F}(\dot\alpha)$$

$$\dot\theta=\frac{mr}{I_F}\int a\,dt-\frac{I_P}{I_F}\dot\alpha+\frac{1}{I_F}\int P_B(\dot\alpha)dt$$

$$\theta=\frac{mr}{I_F}\int\int a\,dt^2-\frac{I_P}{I_F}\alpha+\frac{1}{I_F}\int\int P_B(\dot\alpha)dt^2$$

It is thus apparent that the terms $P_R$ and $P_F$ are eliminated from the equations of motion. With $P_R$ removed from the equations, operability becomes independent of the method of application of torque to the flywheel. For example, pneumatic motors other than reaction turbines may be utilized as torque producers. With $P_F$ removed the losses in the system do not affect its accuracy and it becomes feasible to derive a work output, such as, for example, a mechanical counter or a limit switch. In any application $\theta>>>\alpha$ and thus the second term, $$\frac{I_P}{I_F}\alpha$$

contributes only a very small error to the total answer. It should be noted that this is an instantaneous error which is not integrated over time. For all practical purposes the second term can be made negligible by suitable choice of design parameters. If we consider $P_B$ to be directly proportional to $\dot\alpha$ the third term also becomes a very small quantity which again for practical purposes reduces to zero. If no oscillation occurs $\dot\alpha$ is essentially zero. If oscillations occur $\dot\alpha$ changes direction and tends to cancel under integration.

We are left with $$\theta=\frac{mr}{I_F}\int\int a\,dt^2+\delta$$

where $$\frac{\delta}{\theta}\approx 0 \text{ as } t\gg 0$$

Thus, it can be seen from the above that the angular position $\theta$ of the flywheel is proportional to the second integral of acceleration as a function of time plus a small constant indicative of the final position of the pendulum at time $t$. As the time of acceleration increases, i.e., as the flywheel undergoes several revolutions in a given direction (which are counted by the pulse counter 20 of FIGURE 1) the final position $\alpha$ becomes very small with respect to the total angular displacement of the flywheel. Therefore, after several revolutions $\theta$ becomes almost exactly equal to the double integral of acceleration as a function of time. It is, of course, apparent that the first integral, i.e., frequency of rotation of the flywheel, is available at the output and may be utilized where desired.

Figure 7:
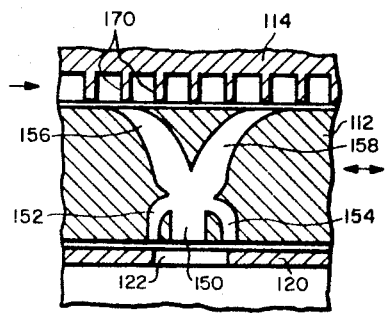
FIGURE 7 is a partial cross-section illustrating the porting to the vanes of the flywheel in the embodiment of FIGURES 5 and 6.
Figure 6:
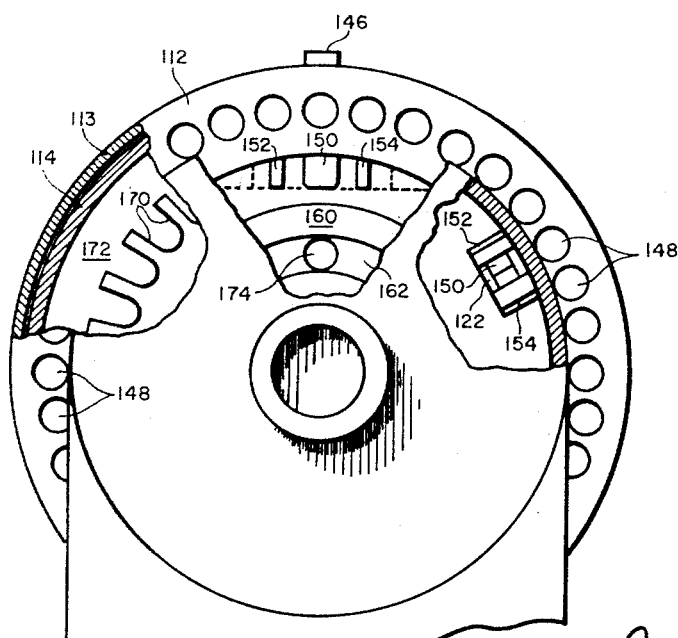
FIGURE 6 is a front elevation with the parts in section showing the accelerometer of FIGURE 5.

FIGURES 5 through 7 illustrate a modified embodiment of the novel double integrating accelerometer of this invention. In this embodiment the accelerometer generally indicated at 109 again consists essentially of a frame 110, a pendulum 112 and a flywheel 114. The cover may be similar to that shown in FIGURE 1 and is shown at 113 in FIGURE 5. In this embodiment the incoming pressurized gas passes through inlet port 116 into chamber 118 of inlet manifold 120. The inlet manifold is provided with an angularly spaced series of ports 122 and one or more signal ports 124.

Rotatably mounted in frame 110 by means of ball bearings 126 and 128 is a rotatable shaft 130 to which is rigidly secured for limited rotating or oscillating movement the pendulum 112. Bearing 126 is suitably mounted in a cavity 132 in the inlet manifold 120 while ball bearing 128 is mounted in an aperture 134 formed in the outlet manifold 136. The inlet and outlet manifolds are rigidly joined by a suitable base 138 rigidly mounted to the vehicle or device subject to acceleration as indicated by the hatching at 140.

Two additional sets of ball bearings 142 and 144 rotatably mount the flywheel 114 on pendulum shaft 130 so that the rotating movement of the flywheel is substantially independent of any oscillating movement of the shaft 130.

Pendulum 112 is provided with an unbalance weight 146 and carries a series of angularly spaced exhaust ports 148. Also provided in the pendulum are an angularly spaced series of fluid amplifying ports 150 which have spaced on each side thereof left and right control ports 152 and 154. These control or pilot ports converge with the main port 150 as best seen in FIGURE 7 and the common flow path splits into separate inlet nozzles 156 and 158 so that there are two such nozzles for each of the main or amplifying ports 150.

Pendulum 112 is also provided with an enlarged chamber 160 in turn communicating with an elongated signal port 162. This enlarged chamber 160 is always in communication with inlet port 124 and passes a pulse signal to an outlet chamber 164 in outlet manifold 136 which chamber communicates with outlet port 166 from which pressure pulses are derived for a suitable utilization device such as the pulse counter of FIGURE 1, a recorder or the like.

In this embodiment the flywheel is provided with a single set of vanes 170 forming the turbine buckets which buckets exhaust to atmosphere through the annular exhaust chamber 172 and ultimately the exhaust ports 148. Flywheel 114 is likewise provided with one or more signal ports 174 establishing communication between inlet port 116 and outlet port 166 once during each revolution of flywheel 114.

An important feature of the embodiment illustrated in FIGURES 5 through 7 is that a bistable pneumatic logic element is used as a pneumatic amplifier. Compressed gas from the intake manifold 120 passes through one of the apertures or ports 122 into one of the main channels 150 of the pendulum 112. Under the proper conditions gas will adhere to only one wall of main channel 150 and will flow to the right or left nozzle 156 or 158 but not to both. If the boundary layer along the respective wall is disturbed by gas entering the respective pilot passageway 152 or 154, the gas flow will immediately switch to the opposite nozzle and remain there until disturbed by gas entering through the alternative corresponding pilot passageway. Small relative motions between the frame 110 of the accelerometer 109 and the pendulum 112 will cause the aperture 122 to open an entrance to either the pilot passageway 152 or pilot passageway 154 and at the same time close the entrance to the other pilot passageway. The entrance to the main channel 150 of the bistable element always remains open and the air flow to the right or left nozzle is therefore dependent on the relative position of the pendulum 112 with respect to frame 110.

Since the single set of vanes 170 are substantially radial as best seen in FIGURE 6 the gas entering through the nozzle will impinge upon the flywheel buckets formed by the vanes imparting either a clockwise or counterclockwise torque to the flywheel 114. As the gas expands it flows through the return channel 172 in the flywheel and the return ports 148 in the pendulum. The gas escapes to the atmosphere with a velocity which is coaxial to the axis of rotary motion.

As best seen in FIGURE 6 the pendulum 114 carries the unbalance mass 146. When this mass senses an acceleration "$a$" as indicated by the arrows in FIGURE 6, it produces a counterclockwise torque on the pendulum 112 which opens the pilot passageway 154 directing air flow to the nozzle 156 which imparts a reaction torque against the flywheel causing it to rotate in a counterclockwise direction. Through suitable selection of gas pressure and relationship and size of parts it is possible to construct the unit so that the reaction torque is always greater than the torque caused by the expected acceleration. The reaction torque imparts a clockwise motion to the pendulum closing pilot 154 and opening pilot 152 which switches the air flow to nozzle 158 imparting a reverse action to the system. An oscillating motion of the pendulum results from this action. The net result, however, is a rotation of the flywheel whose angular acceleration will be proportional to the linear acceleration "a."

The equations of motion for the embodiment of FIGURES 5 through 7 are identical to those previously given with respect to the embodiment of FIGURES 1 through 4. The parameter associated with the pendulum, $\alpha$, represents average values taken over several cycles of the oscillation. This oscillation, or "dither" motion of the pendulum is beneficial in that it practically eliminates static or "stiction" friction of the pendulum bearings and provides a threshold or sensitivity to low level accelerations with ball bearings comparable to that obtained from air bearings.

It is apparent from the above that the present invention provides a novel double integrating accelerometer of the pneumatically operated type such as to be completely independent from adverse effects of radiation which of course is not the case with many of the known methods of obtaining double integration of acceleration. In addition to this substantial insensitivity the accelerometer of the present invention requires no complex gearing, no mainspring, no latching arrangement subject to failure, may be simply and inexpensively manufactured, and is completely reliable in operation. An important feature of the present invention resides in the digital or pulsating output delivered by the unit which makes for reliable indications of the desired output signal through the use of a conventional pneumatic pulse counter and also the fact that the double integration is obtained without the use of any separate time standard to which the signal must be compared, again as is the case with many known constructions. The accelerometer produces a digital output which is directly dependent on the work done on the flywheel and real time. Specifically, it is dependent upon the second integral of acceleration. The pendulum may be initially at rest as in FIGURES 1–4 (three position valve assembly) or may hunt around a rest position when not subject to acceleration forces as in the embodiment of FIGURES 5–7 (two position valve assembly). The device performs a double integral of acceleration as a natural product of dynamic laws utilizing pneumatics without gearing. It provides an inertial device that is completely immune to the effects of neutron and gamma radiation and which device is useful both in guidance and in fuzing applications.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An accelerometer comprising a frame having pressure gas inlet and outlet ports, a gas driven flywheel, said flywheel being rotatably supported by a pendulous valve, said valve being supported by said frame and being movable in response to acceleration forces and internal friction forces to control the flow of gas from said inlet port to said flywheel, whereby pressure gas passing through said valve from said inlet port causes said flywhel to rotate, and means for producing a gas pressure signal at said outlet port indicative of the movement of said flywheel.

2. An accelerometer comprising a frame having pressure gas inlet and outlet ports, a gas driven flywheel rotatably supported by a pendulous valve and having an axis of rotation parallel with the axis of rotation of said valve, said valve serving to establish periodic communication between said inlet and outlet ports representative of the amount of its rotation, said pendulous valve pivotally mounted by said frame and coupling said inlet port to said flywheel, said pendulous valve constituting an acceleration responsive unbalance mass, and valve means in said pendulous valve for supplying pressure gas from said inlet port to said flywheel in alternate directions in accordance with the direction and magnitude of acceleration forces acting on said unbalance mass, as well as in accordance with the internal forces between said flywheel and said pendulous valve.

3. An accelerometer according to claim 2 wherein said valve means is normally closed when said unbalance mass is not accelerated.

4. An accelerometer according to claim 2 wherein said valve means is always in one of two possible open positions.

5. An accelerometer according to claim 4 wherein said valve means comprises a pneumatic bi-stable logic element.

6. An accelerometer comprising a housing having a pressure gas inlet, a rotatable flywheel having a plurality of turbine vanes, an oscillatable pendulum surrounding and supporting said flywheel and including an unbalance mass, said pendulum having an axis of rotation parallel with the axis of rotation of said flywheel, said pendulum including a first and second series of nozzles for supplying pressure gas from said inlet to said vanes to cause rotation of said flywheel in one direction or the other, said pendulum including reaction means whereby the action exerted on said vanes by said pressure gas from one of said series of nozzles produces an equal and opposite reaction on said pendulum, and means coupled to said flywheel for sensing the amount of its rotation.

7. An accelerometer according to claim 6 wherein said nozzles alternately apply pressure gas from said inlet to opposite sides of said vanes in response to the movement of said balance mass under the influence of acceleration forces.

8. An accelerometer according to claim 6 wherein said flywheel is provided with two sets of vanes, and said first series of nozzles apply pressure gas to one of said sets of vanes and said second series of nozzles apply pressure gas to the other of said sets of vanes.

9. An accelerometer comprising a frame having pressure gas inlet and outlet ports, a pendulum rotatably mounted in said frame, a gas driven flywheel rotatably supported in said pendulum, with an axis of rotation parallel with the axis of said pendulum, said pendulum having valve means for periodically coupling said inlet port to said outlet port in accordance with the amount of its rotation, said pendulum including an acceleration responsive unbalance mass rotatably mounted by said frame, a plurality of nozzles for directing pressure gas from said inlet port to said flywheel to drive said flywheel, said nozzles including a first series for driving said flywheel in one direction and a second series for driving said flywheel in the opposite direction, means responsive to movement of said pendulum for valving said nozzles whereby said flywheel is driven in the direction of movement of said pendulum, said pendulum including reaction means adjacent said flywheel whereby the action of the pressure gas acting on said flywheel produces an equal and opposite reaction on said pendulum opposing said movement of said pendulum.

10. An accelerometer according to claim 9 wherein said reaction means is of sufficient size to overcome said movement and return said pendulum to its initial position.

11. A pneumatic acceleration sensing apparatus comprising a gas pressure source, a rotatable flywheel having a plurality of turbine vanes arranged to be acted upon by gas pressure from said source, acceleration responsive valve means coupling said source to said flywheel and modulating the flow from said source, said flywheel being driven in rotation by said source in accordance with the amount of acceleration sensed by said valve means, said valve means containing said flywheel and said valve means being so oriented relative to the flywheel that the flow against the flywheel produces a reaction on the valve means that tends to move the valve means in a direction opposite that which the means are moved by the applied acceleration and establish a mean position for said valve means, and means coupled to said flywheel for sensing the amount of its rotation, thus to furnish the second integral of acceleration.

12. Apparatus according to claim 11 wherein said valve means comprises a triple acting valve having two open positions and an intermediate closed position.

13. Apparatus according to claim 11 wherein said valve means comprises a double acting valve having two open positions.

14. A double integrating accelerometer comprising a frame in which a pendulous mass is rotatably mounted, said frame having an inlet for pressurized fluid and at least one port by which such pressurized fluid can be caused to flow toward said pendulous mass, said pendulous mass being movable in either direction about its mounting axis in response to external acceleration, a flywheel rotatably mounted in said pendulous mass, said flywheel having an axis of rotation parallel to that of said pendulous mass, said pendulous mass having a plurality of nozzles therein, with a first set of one or more nozzles being brought into registry with the port of said frame upon said pendulous mass being caused by external acceleration to rotate away from a null point in a first direction about its axis, and a second set of one or more nozzles being arranged to be brought into registry with the port of said frame upon said pendulous mass being caused to rotate in the opposite direction, said flywheel having vanes therein, disposed to be impacted upon by fluid from said nozzles, said flywheel being caused to rotate in a direction dependent upon the direction said pendulous mass is caused to rotate, whereby the degree of rotation of said pendulous mass about its axis of rotation reflects the acceleration to which said accelerometer is subjected, and the rotation of said flywheel reflects the second integral of such acceleration.

15. A double integrating accelerometer comprising a frame having pressurized fluid inlet means, a pendulous mass rotatably supported in said frame and having disposed thereon two sets of one or more nozzles, at least one port in said frame capable of supplying fluid to said nozzles except when said pendulous mass is in a null position, the rotation of said pendulous mass in one direction or the other away from such null position controlling with which nozzles said port will register, and the degree of registration; and a flywheel rotatably supported in said pendulous mass, the axis of rotation of said flywheel being parallel to the axis of rotation of said pendulous mass, said flywheel having vanes across which the fluid flowing from said port and across said nozzles can flow, thus to cause the rotation of said flywheel by a torque dependent upon the direction and the amount of rotation of said pendulous mass with respect to said null position, said pendulous mass being unbalanced and tending to rotate with respect to said frame, such rotation being in a direction opposed to the direction of acceleration to which the accelerometer is subjected, the rotation of said pendulous mass in one direction bringing about the porting of fluid to cause torque on said flywheel in the same direction, with rotation of said pendulous mass in the opposite direction likewise causing an opposite torque on said flywheel, whereby the degree and direction of movement of said pendulous mass controlls the speed and direction of rotation of said flywheel, such speed being the first integral of the acceleration and the rotation being the second integral of the acceleration.

References Cited

UNITED STATES PATENTS

| 1,728,904 | 9/1929 | Herr | 73—490 |
| 2,338,536 | 1/1944 | Carcasson | 73—503 XR |
| 3,046,792 | 7/1962 | Morgan | 73—490 |
| 3,161,064 | 12/1964 | Johnston | 73—490 |
| 3,335,612 | 8/1967 | Stouffer | 73—490 |

JAMES J. GILL, *Primary Examiner.*

U.S. Cl. X.R.

73—503